Patented Apr. 14, 1925.

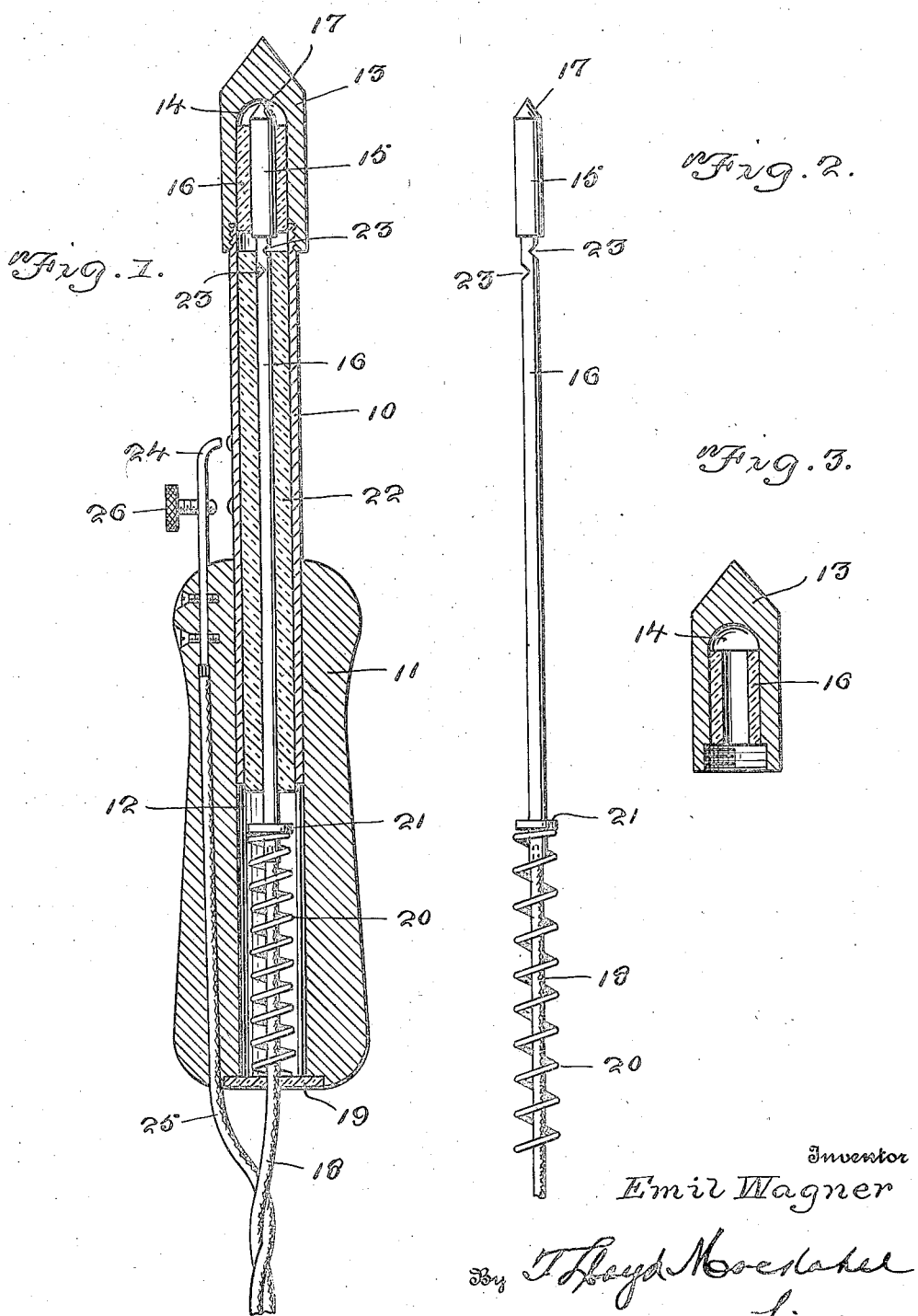

1,533,959

UNITED STATES PATENT OFFICE.

EMIL WAGNER, OF LOVELAND, COLORADO.

ELECTRIC SOLDERING DEVICE.

Application filed October 31, 1922. Serial No. 598,224.

*To all whom it may concern:*

Be it known that I, EMIL WAGNER, intending to become a citizen of the United States, residing at Loveland, in the county of Larimer and State of Colorado, (now subject of Switzerland), have invented a new and useful Electric Soldering Device, of which the following is a specification.

This invention relates to improvements in electric soldering irons and has for an object the provision of an iron which may be operated on a low current voltage, such as a storage battery, provision being made for conveniently controlling the flow of current to the heating element and thus reducing the danger of injury to said element or to the battery which supplies the current.

Another object of the invention is the provision of an electric soldering iron in which the heating element is so constructed and arranged as to provide a maximum amount of resistance at its point of contact with the soldering point and thus obtain a maximum amount of heat from a relatively small current supply, provision being made for insuring proper contact between the heating element and the soldering point so that an even flow of current and an even heat is assured.

Another object of the invention is the provision of means for resisting the travel of heat from the heating element to the handle of the iron, so that the said handle will not become overheated.

With the above and other objects in view, the invention further includes the following novel features and details of construction, to be hereinafter more fully described, illustrated in the accompanying drawings and pointed out in the appended claims.

In the drawings:—

Figure 1 is a longitudinal sectional view of a soldering iron constructed in accordance with the invention.

Figure 2 is an elevation of the heating element and rod removed from the iron.

Figure 3 is a sectional view of the soldering point.

Referring to the drawings in detail whereon like characters of reference denote corresponding parts, the reference character 10 indicates the shank of the iron which is of tubular form and which is provided at one end with a suitable handle 11, the latter having a central bore 12 within one end of which the shank 10 is secured.

Threadedly and removably secured to the opposite end of the shank 10 is a soldering point 13 of suitable material, the said point being provided with a socket 14 within which is positioned a heating element 15. An insulating sleeve 16 is interposed between the heating element and the adjacent walls of the socket 14.

The heating element 15 is carried at one end of a rod 16 through which current is supplied to the heating element as will be later described. One end of the heating element is pointed as indicated at 17 and this pointed end engages the bottom wall of the socket 14 and forms resistance to the flow of current, whereby the element will become quickly heated with the greatest amount of heat at its point of contact with the soldering point 13. One end of the rod 16 is connected to a conductor 18 which leads to a suitable source of current, the conductor 18 passing through an opening provided in a plate 19 which closes one end of the bore 12 of the handle. A spring 20 surrounds the conductor 18 and has one end bearing against the plate 19 and its opposite end against a shoulder or collar 21 carried by the rod 16, so that the point of the heating element will be forced into contact with the soldering point at all times and irrespective of the contraction and expansion of the different parts of the iron. The rod 16 is surrounded by an insulating sleeve 22 and is provided with notches 23, the latter acting to resist the travel of heat from the heating element toward the handle by reducing the thickness of the rod at this point and providing air gaps.

Secured to the handle 11 is a spring switch arm 24 which has secured thereto a conductor 25 also leading to the source of current. This spring switch arm 24 is adapted to have its free end engage the tubular shank 10 so as to close a circuit through the iron, the circuit being broken as soon as pressure upon the switch arm is released. In order to hold the switch in closed position, the arm 24 carries a contact screw 26 which may be engaged with the shank 10 and accidental opening of the switch prevented.

The invention is susceptible of various changes in its form, proportions and minor details of construction and the right is herein reserved to make such changes as properly fall within the scope of the appended claims, Having described the invention what is claimed is:—

1. An electric soldering iron comprising a tubular shank, a handle at one end thereof, a soldering point removably secured to the opposite end of the handle and provided with a socket, an electric heating element within said socket and engaging the soldering point, means for yieldingly holding the element in engaged position, means whereby current may be conducted to said element to heat the soldering point, a switch for controlling the supply of current and means included in the current conducting means for resisting the travel of heat from the heating element to the handle.

2. An electric soldering iron comprising a tubular shank, a handle at one end thereof, a soldering point removably secured to the opposite end of the shank and provided with a socket, an electric heating element within said socket, a pointed extremity on said element for engaging the relatively flat end wall of the socket of the soldering point, whereby resistance at the point of engagement is increased, means including a rod having one end secured to the heating element, whereby current may be supplied to the heating element, spring means for forcing the heating element in engaged position and a switch for controlling the supply of current to the heating element.

3. An electric soldering iron comprising a tubular shank, a handle at one end thereof, a soldering point removably secured to the opposite end of the shank and provided with a socket, an electric heating element within said socket and engaging the soldering point, means including a rod having one end secured to the heating element, whereby current may be supplied to said element, said rod being provided with notches defining air gaps to resist travel of heat, spring means for forcing the heating element in engaged position and a switch for controlling the supply of current to the heating element.

4. An electric soldering iron comprising a tubular shank, a handle at one end thereof, a soldering point removably secured to the opposite end of the shank and provided with a socket, an electric heating element within said socket and engaging the soldering point, means including a rod having one end secured to the heating element, whereby current may be supplied to the heating element, spring means for forcing the heating element in engaged position, a spring switch for controlling the supply of current to the heating element and means whereby the switch may be secured in closed position.

EMIL WAGNER.